United States Patent
Cabello et al.

(10) Patent No.: US 10,215,049 B2
(45) Date of Patent: Feb. 26, 2019

(54) AIR CYCLE MACHINE LOCKOUT TOOL

(71) Applicant: Hamilton Sundstrand Corporation, Windsor Locks, CT (US)

(72) Inventors: Brian Cabello, Windsor, CT (US); Darryl A. Colson, West Suffield, CT (US); John M. Beck, Windsor, CT (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 575 days.

(21) Appl. No.: 14/802,246

(22) Filed: Jul. 17, 2015

(65) Prior Publication Data

US 2017/0016344 A1  Jan. 19, 2017

(51) Int. Cl.

| | | |
|---|---|---|
| *F16B 35/00* | (2006.01) | |
| *F01D 21/00* | (2006.01) | |
| *B64F 5/10* | (2017.01) | |
| *B64F 5/40* | (2017.01) | |
| *B64D 13/06* | (2006.01) | |
| *F16B 1/02* | (2006.01) | |

(52) U.S. Cl.
CPC .............. *F01D 21/006* (2013.01); *B64F 5/10* (2017.01); *B64F 5/40* (2017.01); *F16B 35/005* (2013.01); *B64D 13/06* (2013.01); *B64D 2013/0648* (2013.01); *F16B 1/02* (2013.01); *Y02T 50/56* (2013.01)

(58) Field of Classification Search
CPC .............................. F16B 35/005; F01D 21/006
USPC ......................................................... 411/393
See application file for complete search history.

(56) References Cited

U.S. PATENT DOCUMENTS

| | | | | |
|---|---|---|---|---|
| 1,107,177 A | * | 8/1914 | Noble ................... | F16B 35/005 292/1 |
| 2,111,243 A | * | 3/1938 | Hecht ..................... | F16L 25/08 285/154.1 |
| 2,560,080 A | * | 7/1951 | Bottome ............... | F16B 35/005 411/393 |
| 3,102,746 A | * | 9/1963 | Kerr .......................... | F16B 5/02 164/385 |

(Continued)

FOREIGN PATENT DOCUMENTS

| | | |
|---|---|---|
| DE | 9309556 | 8/1993 |
| FR | 936548 | 7/1948 |

(Continued)

OTHER PUBLICATIONS

EP Application No. 16179957.2 Extended European Search Report dated Dec. 9, 2016, 6 pages.

*Primary Examiner* — Flemming Saether
(74) *Attorney, Agent, or Firm* — Cantor Colburn LLP

(57) ABSTRACT

A lockout tool for an air cycle machine includes a lockout tool body threaded section, a lockout tool body end section, and a lockout tool body conical tip. The lockout tool body threaded section is operable to engage a threaded port of the air cycle machine that is proximate to a shaft of the air cycle machine. The lockout tool body end section includes a rotation interface operable to receive a rotational force to control engagement of the lockout tool body threaded section with the threaded port. The lockout tool body conical tip is operable to engage the shaft of the air cycle machine to prevent rotation of the shaft.

16 Claims, 4 Drawing Sheets

(56) References Cited

U.S. PATENT DOCUMENTS

| | | | | |
|---|---|---|---|---|
| 4,895,469 A * | 1/1990 | Coueron | ............... | F16B 21/186 |
| | | | | 403/21 |
| 4,930,371 A * | 6/1990 | Schneider | ............... | F02B 75/06 |
| | | | | 123/198 R |
| 5,704,218 A | 1/1998 | Christians et al. | | |
| 8,057,160 B2 * | 11/2011 | Bart | ..................... | F01D 21/006 |
| | | | | 415/9 |
| 8,419,283 B2 | 4/2013 | Mcauliffe et al. | | |
| 8,783,952 B1 | 7/2014 | Beers et al. | | |
| 2008/0172979 A1 * | 7/2008 | Wilson | .................... | E04C 5/165 |
| | | | | 52/848 |
| 2017/0114661 A1 * | 4/2017 | Schwarz | ............... | F01D 21/006 |
| 2017/0219019 A1 * | 8/2017 | Wirsch, Jr. | ............. | A47L 11/08 |

FOREIGN PATENT DOCUMENTS

| | | |
|---|---|---|
| GB | 880397 | 10/1961 |
| JP | 2009063067 | 3/2009 |
| WO | 9946166 | 9/1999 |

\* cited by examiner

AIR CYCLE MACHINE LOCKOUT TOOL

BACKGROUND

The present disclosure generally relates to aircraft environmental control systems and, more particularly, to a lockout tool for an air cycle machine utilized as part of an aircraft environmental control system.

Conventional aircraft environmental control systems (ECS) incorporate an air cycle machine (ACM), also referred to as an air cycle cooling machine, for cooling and dehumidifying air supplied to an aircraft cabin. ACMs commonly include at least one turbine and a compressor spaced axially at intervals on a common shaft. The turbine(s) and compressor are supported for rotation about the axis of the shaft by one or more bearing assemblies.

On aircraft powered by turbine engines, the air to be conditioned in the air cycle machine is typically compressed air bled from one or more compressor stages of a turbine engine. In conventional systems, this bleed air is passed through the air cycle machine compressor, where it is further compressed, then passed through a condensing heat exchanger to cool the compressed air. The heat exchanger sufficiently condenses moisture thereby dehumidifying the air. The dehumidified compressed air is then expanded in one of the turbines to extract energy from the compressed air so as to drive the shaft and also to cool the expanded turbine exhaust air as it is supplied to the cabin as conditioned cooling air.

During normal operation of an ACM, the shaft is typically driven to rotate as noted above. However, during certain failure modes, the shaft may continue to rotate without being directly driven. An aircraft may continue to fly safely with a failed ACM but continued rotation of the shaft of a failed ACM can lead to undesirable results, such as damage to other parts within the ACM, release of debris, odors, and the like.

BRIEF DESCRIPTION

According to one embodiment, a lockout tool for an air cycle machine includes a lockout tool body threaded section, a lockout tool body end section, and a lockout tool body conical tip. The lockout tool body threaded section is operable to engage a threaded port of the air cycle machine that is proximate to a shaft of the air cycle machine. The lockout tool body end section includes a rotation interface operable to receive a rotational force to control engagement of the lockout tool body threaded section with the threaded port. The lockout tool body conical tip is operable to engage the shaft of the air cycle machine to prevent rotation of the shaft.

A method of preventing rotation of a shaft in an air cycle machine includes aligning a lockout tool body threaded section of a lockout tool with a threaded port of the air cycle machine that is proximate to the shaft of the air cycle machine. A rotational force is applied to a lockout tool body end section of the lockout tool that includes a rotation interface to control engagement of the lockout tool body threaded section with the threaded port. A lockout tool body conical tip of the lockout tool is engaged with the shaft of the air cycle machine to prevent rotation of the shaft.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
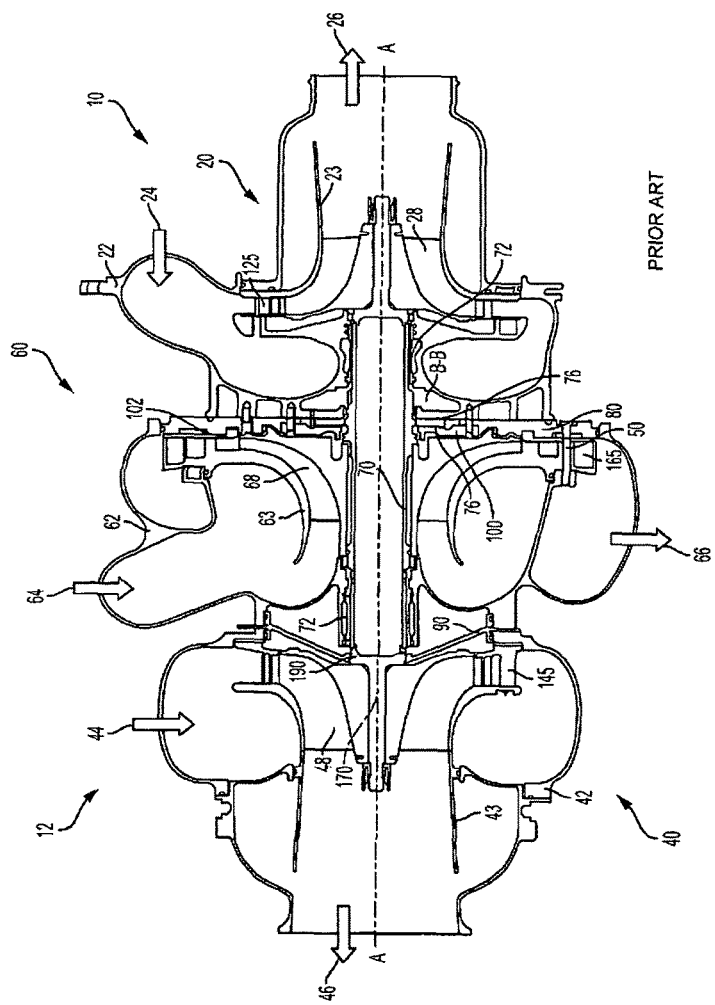
FIG. 1 is a cross-section of an air cycle machine (ACM) according to an embodiment.

Referring now to FIG. 1, an air cycle machine (ACM) 10 includes a first turbine 20, a second turbine 40, and a compressor 60. The ACM 10 includes a housing assembly 12 manufactured from multiple housing portions to provide a desired clearance for the compressor 60 and the turbines 20, 40. The ACM housing assembly 12 includes a first turbine housing 22, a compressor housing 62, and a second turbine housing 42. The ACM housing assembly 12 also includes first and second turbine shrouds 23 and 43, and a compressor shroud 63. The first turbine housing 22 and the second turbine housing 42 are connected to the centrally located compressor housing 62.

The first turbine 20 has an inlet 24, a nozzle 125, and an outlet 26. The second turbine 40 has an inlet 44, a nozzle 145, and an outlet 46. The compressor 60 also includes an inlet 64, a diffuser 165, and an outlet 66. The compressor 60 is driven by the first and second turbines 20 and 40. The first turbine 20 includes a first turbine rotor 28, the second turbine 40 includes a second turbine rotor 48, and the compressor 60 includes a compressor rotor 68. The first and second turbine rotors 28, 48 and the compressor rotor 68 are coupled to a shaft 70 for rotation about an axis A. In one embodiment, the shaft 70 is hollow and is supported within the ACM housing assembly 12 by bearings 72, such as hydrodynamic journal bearings, for example. The shaft 70 may include a plurality of apertures (not shown) such that a cooling flow enters into the shaft 70 to cool the bearings 72. Thrust bearings 76 are coupled to the shaft 70 to support axial loads in the ACM 10.

A first seal plate 80 separates air flow between the first turbine 20 and the compressor 60. A second seal plate 90 separates air flow between the compressor 60 and the second turbine 40. The first seal plate 80 is coupled to the first turbine housing 22 and the compressor housing 62. The second seal plate 90 is coupled to the second turbine housing 42 and the compressor housing 62. The first seal plate 80 is also coupled to a thrust plate 100 to constrain axial movement of the thrust bearings 76. A backing plate 102 may be installed between the diffuser 165 of the compressor 60 and the first seal plate 80. A plurality of fasteners 50, such as bolts, may be used to secure the seal plates 80 and 90. The illustrated ACM 10 is an example and other configurations known to a person skilled in the art are within the scope of this disclosure. A combination of two or more components of the ACM 10 is referred to generally as an ACM assembly.

Figure 2:
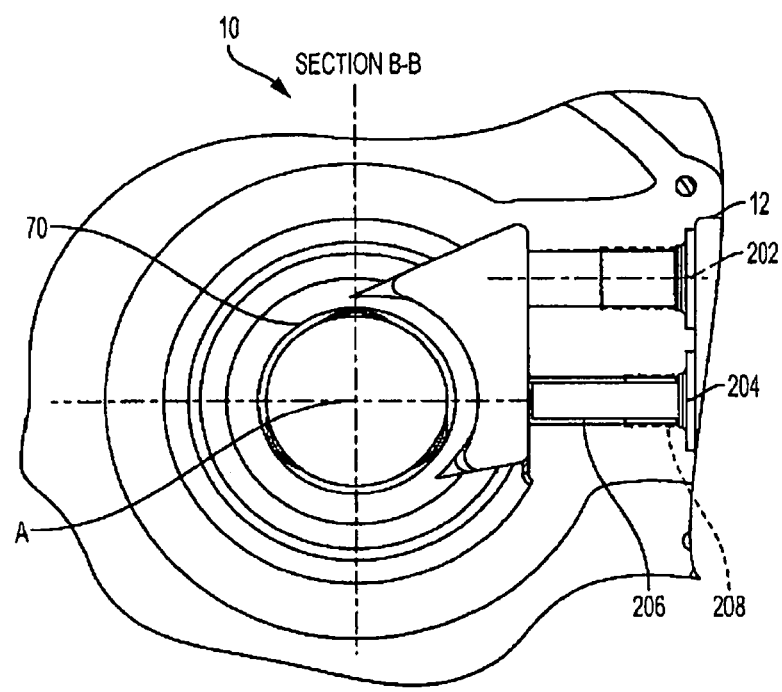
FIG. 2 is a partial sectional view of a portion of the ACM of FIG. 1 according to an embodiment.
Figure 3:
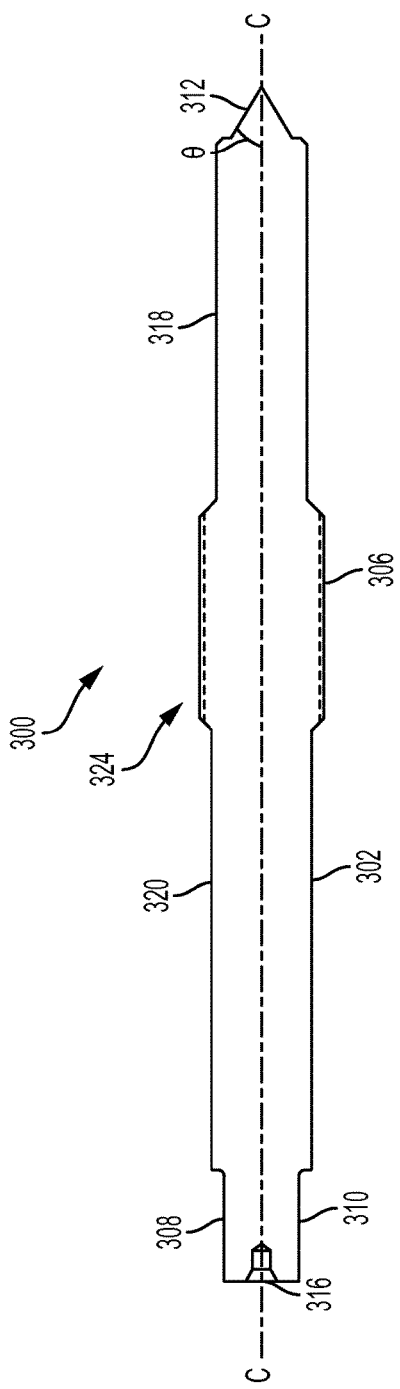
FIG. 3 is a cross-section of a lockout tool body of a lockout tool according to an embodiment.
Figure 4:
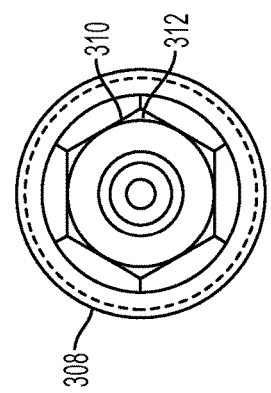
FIG. 4 is an end view of the lockout tool body of FIG. 3 according to an embodiment.
Figure 5:
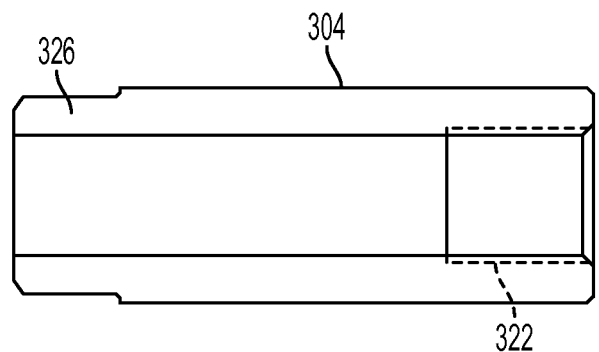
FIG. 5 is cross-section of a lockout collar according to an embodiment.
Figure 6:
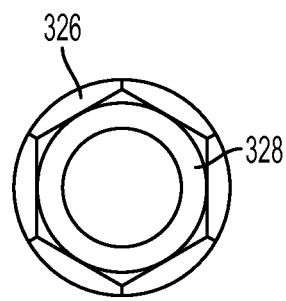
FIG. 6 is an end view of the lockout collar of FIG. 5 according to an embodiment.

Various access ports in close proximity to the shaft 70 may be incorporated in the housing assembly 12 of the ACM 10. As one example, at section B-B of the ACM 10, as depicted in FIG. 2, threaded ports, such as a bearing cooling exhaust port 202 and a speed sensor port 204, are incorporated in the housing assembly 12. The bearing cooling exhaust port 202 may be coupled to a hose or other exhaust fitting under normal operation. The speed sensor port 204 may include a speed sensor 206 engaged with threads 208 of the speed sensor port 204 under normal operation. Upon a failure condition of the ACM 10, a lockout tool 300 (FIG. 3) can be installed in one or more threaded ports of the ACM 10, such as in the bearing cooling exhaust port 202 and/or the speed sensor port 204. Thus, rather than taking an aircraft immediately out of service that includes a faulty ACM 10, a service technician may remove the speed sensor 206 from the speed sensor port 204 and replace the speed sensor 206 with the lockout tool 300 to prevent further rotation of the shaft 70. At a next scheduled major service interval, the faulty ACM 10 can be repaired or replaced without risking further damage to the ACM 10 or adverse effects to other aircraft components.

With reference to FIGS. 1-6, the lockout tool 300 includes a lockout tool body 302 and a lockout collar 304. The lockout tool body 302 includes lockout tool body threaded section 306 operable to engage a threaded port of the ACM 10 that is proximate to the shaft 70 of the ACM 10, such as the bearing cooling exhaust port 202 or the speed sensor port 204. The lockout tool body 302 also includes a lockout tool body end section 308 having a rotation interface 310 operable to receive a rotational force to control engagement of the lockout tool body threaded section 306 with the threaded port of the ACM 10. The lockout tool body 302 further includes a lockout tool body conical tip 312 operable to engage the shaft 70 of the ACM 10 to prevent rotation of the shaft 70. In one embodiment, the lockout tool body conical tip 312 has angle θ of about 30 degrees relative to a center axis C of the lockout tool 300.

In one embodiment, the rotation interface 310 of the lockout tool body end section 308 has a hexagonal surface 314 operable to be engaged by a hexagonal socket wrench to receive a rotational force to drive the lockout tool body conical tip 312 into the shaft 70. The lockout tool body end section 308 may also include a countersink 316.

Sizing of the lockout tool 300 can be customized to fit the geometry of the ACM 10. For example, a length of an ACM-inner portion 318 between the lockout tool body threaded section 306 and the lockout tool body conical tip 312 of the lockout tool body 302 can be established based on a radial distance between a threaded port in the housing assembly 12 of the ACM 10 and the shaft 70. Similarly, a length of an ACM-outer portion 320 between the lockout tool body threaded section 306 and the lockout tool body end section 308 can be established based on accessibility and placement constraints with respect to the threaded port in the housing assembly 12 of the ACM 10. For instance, the bearing cooling exhaust port 202 or the speed sensor port 204 may be in a recessed portion of the housing assembly 12.

The lockout collar 304 is sized to fit over the lockout tool body end section 308. The lockout collar 304 can include a threaded section 322 operable to engage a portion 324 of the lockout tool body threaded section 306. In an embodiment, the lockout collar 304 also includes an end section 326 having a hexagonal surface 328 operable to be engaged by a hexagonal socket wrench to lock the lockout collar 304 in place with respect to the lockout tool body threaded section 306.

In an embodiment, rotation of the shaft 70 within the ACM 10 can be prevented by engaging the lockout tool 300 with the shaft 70. The lockout tool body threaded section 306 of the lockout tool 300 can be aligned with a threaded port of the ACM 10 that is proximate to the shaft 70 of the ACM 10. A rotational force is applied to the rotation interface 310 to control engagement of the lockout tool body threaded section 306 with the threaded port. The lockout tool body conical tip 312 of the lockout tool 300 engages with the shaft 70 of the ACM 10 to prevent rotation of the shaft 70. As one example, a service technician can remove the speed sensor 206 from the speed sensor port 204, replace the speed sensor 206 with the lockout tool 300, and apply torque to the rotation interface 310 of a sufficient amount that the lockout tool body conical tip 312 applies about three times the torque from the rotation interface 310 to the shaft 70 (e.g., 100 inch-pounds (11.3 Nm) to 300 inch-pounds (33.9 Nm)). Once a desired torque level is applied, the lockout collar 304 can be placed over the lockout tool body end section 308, and a portion 324 of the lockout tool body threaded section 306 is engaged with a threaded section 322 of the lockout collar 304. In an embodiment, the lockout collar 304 can be locked in place with respect to the lockout tool body threaded section 306 by a service technician using a hexagonal socket wrench to engage the hexagonal surface 328 of the end section 326 of the lockout collar 304.

The terminology used herein is for the purpose of describing particular embodiments only and is not intended to be limiting. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An air cycle machine system comprising:
   a shaft for rotation about an axis of an air cycle machine;
   a threaded port of the air cycle machine proximate the shaft; and
   a lockout tool comprising:
      a lockout tool body threaded section operable to engage the threaded port of the air cycle machine that is proximate to the shaft of the air cycle machine;
      a lockout tool body end section comprising a rotation interface operable to receive a rotational force to control engagement of the lockout tool body threaded section with the threaded port; and
      a lockout tool body conical tip operable to engage the shaft of the air cycle machine to prevent rotation of the shaft.

2. The air cycle machine system according to claim 1, wherein the threaded port is a speed sensor port of the air cycle machine.

3. The air cycle machine system according to claim 1, wherein the threaded port is a bearing cooling exhaust port of the air cycle machine.

4. The air cycle machine system according to claim 1, wherein the rotation interface of the lockout tool body end section further comprises a hexagonal surface operable to be engaged by a hexagonal socket wrench to receive the rotational force.

5. The air cycle machine system according to claim 1, wherein the lockout tool body conical tip has angle of about 30 degrees relative to a center axis of the lockout tool.

6. The air cycle machine system according to claim 1, further comprising a lockout collar sized to fit over the lockout tool body end section.

7. The air cycle machine system according to claim 6, wherein the lockout collar further comprises a threaded section operable to engage a portion of the lockout tool body threaded section.

8. The air cycle machine system according to claim 7, wherein the lockout collar further comprises an end section comprising a hexagonal surface operable to be engaged by a hexagonal socket wrench to lock the lockout collar in place with respect to the lockout tool body threaded section.

9. A method of preventing rotation of a shaft within an air cycle machine, the method comprising:
   aligning a lockout tool body threaded section of a lockout tool with a threaded port of the air cycle machine that is proximate to the shaft of the air cycle machine;
   applying a rotational force to a lockout tool body end section of the lockout tool comprising a rotation interface to control engagement of the lockout tool body threaded section with the threaded port; and
   engaging a lockout tool body conical tip of the lockout tool with the shaft of the air cycle machine to prevent rotation of the shaft.

10. The method according to claim 9, wherein the threaded port is a speed sensor port of the air cycle machine, the method further comprising:
    removing a speed sensor from the speed sensor port; and
    replacing the speed sensor with the lockout tool.

11. The method according to claim 9, wherein the threaded port is a bearing cooling exhaust port of the air cycle machine.

12. The method according to claim 9, wherein the rotation interface of the lockout tool body end section further comprises a hexagonal surface operable to be engaged by a hexagonal socket wrench to receive the rotational force.

13. The method according to claim 9, wherein the lockout tool body conical tip has angle of about 30 degrees relative to a center axis of the lockout tool.

14. The method according to claim 9, further comprising:
    placing a lockout collar over the lockout tool body end section.

15. The method according to claim 14, further comprising:
    engaging a portion of the lockout tool body threaded section with a threaded section of the lockout collar.

16. The method according to claim 15, wherein the lockout collar further comprises an end section comprising a hexagonal surface, the method further comprising:
    locking the lockout collar in place with respect to the lockout tool body threaded section using a hexagonal socket wrench to engage the hexagonal surface of the end section of the lockout collar.

* * * * *